US010202518B2

United States Patent
Hyun et al.

(10) Patent No.: US 10,202,518 B2
(45) Date of Patent: Feb. 12, 2019

(54) ELASTOMER COMPOSITION AND MAGNETIC FERRITE COATED WITH THE SAME

(71) Applicant: LG INNOTEK CO., LTD., Seoul (KR)

(72) Inventors: Soon Young Hyun, Seoul (KR); Seok Bae, Seoul (KR); So Yeon Kim, Seoul (KR); Won Ha Moon, Seoul (KR); Nam Yang Lee, Seoul (KR); Hyung Eui Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 447 days.

(21) Appl. No.: 14/651,804

(22) PCT Filed: Sep. 4, 2013

(86) PCT No.: PCT/KR2013/007962
§ 371 (c)(1),
(2) Date: Jun. 12, 2015

(87) PCT Pub. No.: WO2014/092300
PCT Pub. Date: Jun. 19, 2014

(65) Prior Publication Data
US 2015/0315407 A1 Nov. 5, 2015

(30) Foreign Application Priority Data
Dec. 13, 2012 (KR) ........................ 10-2012-0145207

(51) Int. Cl.
| | | |
|---|---|---|
| C09D 133/08 | (2006.01) | |
| H01F 1/01 | (2006.01) | |
| C08L 13/00 | (2006.01) | |
| C08L 21/00 | (2006.01) | |
| C08L 33/04 | (2006.01) | |
| C08L 63/00 | (2006.01) | |
| C08K 3/013 | (2018.01) | |
| H01F 1/34 | (2006.01) | |
| H01F 3/00 | (2006.01) | |
| H01F 41/00 | (2006.01) | |

(52) U.S. Cl.
CPC ............ *C09D 133/08* (2013.01); *C08K 3/013* (2018.01); *C08L 13/00* (2013.01); *C08L 21/00* (2013.01); *C08L 33/04* (2013.01); *C08L 63/00* (2013.01); *H01F 1/01* (2013.01); *H01F 1/34* (2013.01); *H01F 3/00* (2013.01); *H01F 41/005* (2013.01)

(58) Field of Classification Search
CPC .................................................. C09D 133/08
See application file for complete search history.

(56) References Cited

U.S. PATENT DOCUMENTS

| | | | |
|---|---|---|---|
| 4,703,338 A | 10/1987 | Sagami et al. | |
| 6,346,356 B1* | 2/2002 | Ohno | G03G 9/0806 430/108.1 |
| 6,361,830 B1 | 3/2002 | Schenk et al. | |
| 2001/0053820 A1* | 12/2001 | Yeager | C08G 65/485 525/186 |
| 2003/0144400 A1* | 7/2003 | Osen | C08K 3/0008 524/432 |
| 2004/0229990 A1* | 11/2004 | Righettini | C09D 4/06 524/445 |
| 2005/0218195 A1* | 10/2005 | Wilson | B23K 35/3613 228/180.22 |
| 2006/0035087 A1* | 2/2006 | Yadav | C03C 27/10 428/411.1 |
| 2007/0193171 A1* | 8/2007 | Finerman | B05D 3/108 52/459 |
| 2008/0079565 A1* | 4/2008 | Koyama | A61B 5/0031 340/539.12 |
| 2008/0311404 A1 | 12/2008 | Diggins | |
| 2009/0258963 A1* | 10/2009 | Moore | C08G 59/3209 522/100 |
| 2010/0212824 A1* | 8/2010 | Lionberger | C09D 133/08 156/275.5 |
| 2012/0161565 A1* | 6/2012 | Bilcai | C09J 5/06 310/154.07 |
| 2013/0175984 A1* | 7/2013 | Yamazaki | H04B 5/0037 320/108 |

FOREIGN PATENT DOCUMENTS

| | | |
|---|---|---|
| CN | 102570128 | 7/2012 |
| KR | 10-2010-0039324 | 4/2010 |

OTHER PUBLICATIONS

Chinese Office Action dated Aug. 9, 2016 issued in Application No. 201380065679.6 (with English translation).
International Search Report dated Nov. 22, 2013 issued in Application No. PCT/KR2013/007962.

\* cited by examiner

*Primary Examiner* — Megan McCulley
(74) *Attorney, Agent, or Firm* — KED & Associates, LLP

(57) ABSTRACT

Provided are an elastomer composition including epoxy resin, acrylate resin, an organic filler, an inorganic filler, a cross linking agent, a hardener, an initiator and a solvent, and a magnetic ferrite for a wireless power transmitting and receiving device, the magnetic ferrite being coated with the elastomater composition having an elastic restoring force not to be damaged by a physical impact applied from the outside.

According to embodiments of the present invention, the magnetic ferrite having improved impact resistance can be provided by being coating with the elastomer composition having the elastic restoring force, and thus an existing problem such as a reduction in magnetic property caused by damage to the ferrite resulting from an external impact can be solved.

12 Claims, 2 Drawing Sheets

【Figure 1】
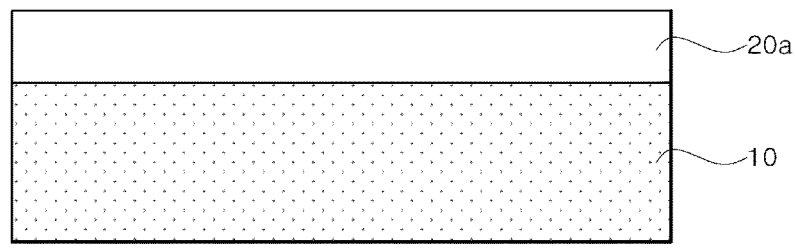
【Figure 2】
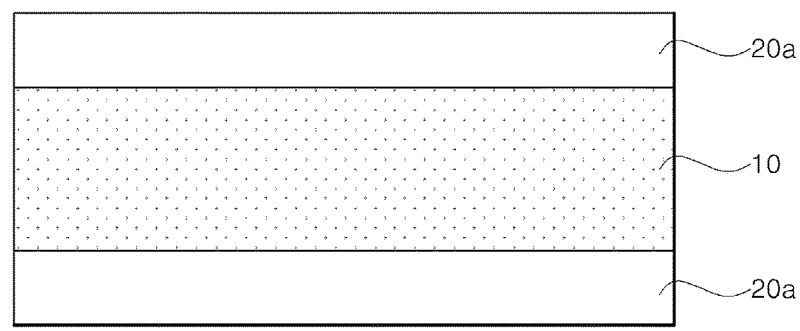
【Figure 3】
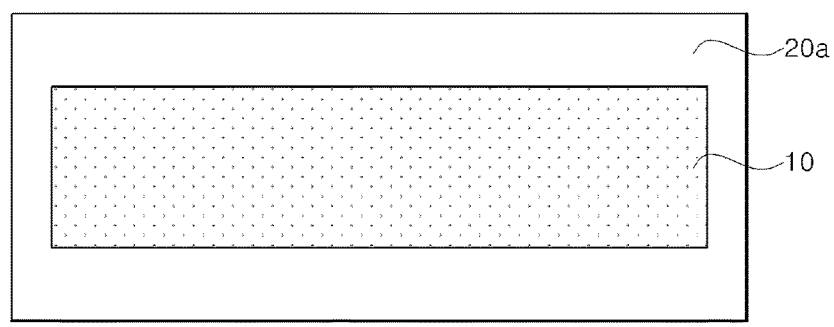

【Figure 4】
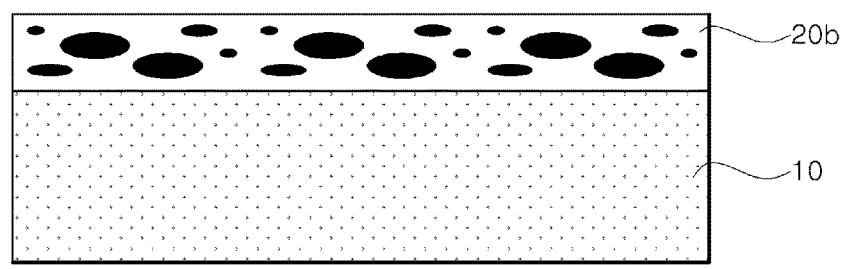
【Figure 5】
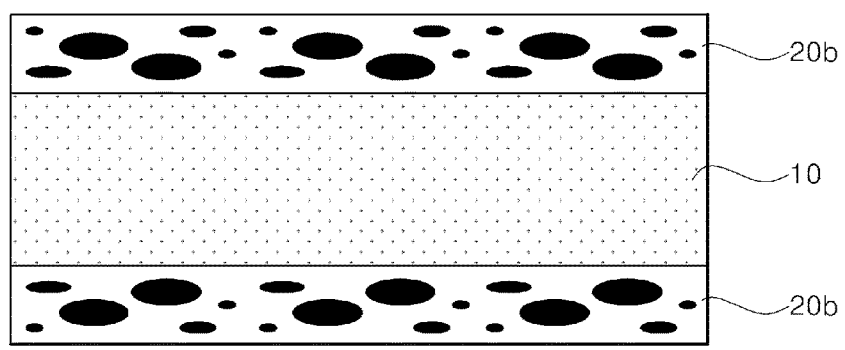
【Figure 6】
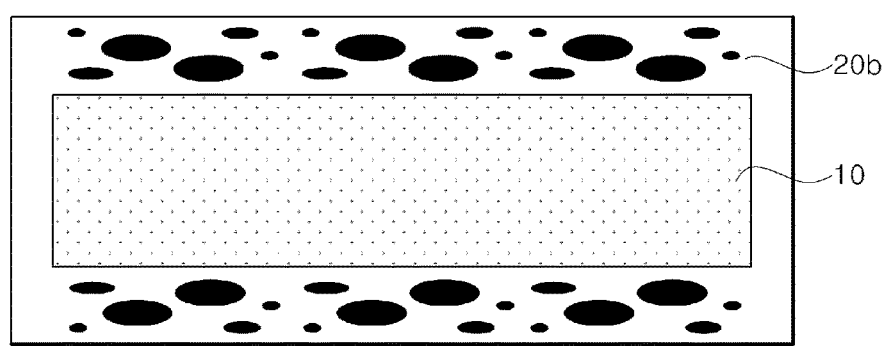

ial Stage Application
ELASTOMER COMPOSITION AND MAGNETIC FERRITE COATED WITH THE SAME

CROSS-REFERENCE TO RELATED PATENT APPLICATIONS

This application is a U.S. National Stage Application under 35 U.S.C. § 371 of PCT Application No. PCT/KR2013/007962, filed Sep. 4, 2013, which claims priority to Korean Patent Application No. 10-2012-0145207, filed Dec. 13, 2012, whose entire disclosures are incorporated herein by reference.

TECHNICAL FIELD

The present invention relates to an elastomer composition and a magnetic ferrite for a wireless power transmitting and receiving device, the magnetic ferrite being coated with the elastomer composition having an elastic restoring force not to be damaged by a physical impact applied from the outside.

BACKGROUND ART

A wireless power transmission technology or a wireless energy transfer technology that wirelessly transfers electric energy from a power source to a desired device already began to be used in an electric motor or a transformer from the 1800s. Since then, a method was tried for transmitting electric energy by radiating electromagnetic waves such as radio waves or laser beams. Electrical toothbrushes or some wireless razors mainly used by general users are actually charged according to the principle of electromagnetic induction. The kinds of wireless energy transmission schemes are as follows.

First, there is an electromagnetic induction scheme using magnetic induction. The magnetic induction scheme, which induces currents from a coil to another coil through a magnetic field, has limitations in that a load power and a relative position and distance between the coils are required to be accurate. Recently, some companies have begun to launch new wireless charge products that can charge portable terminals, personal digital assistants (PDAs), MP3 players, and notebook computers using the electromagnetic induction scheme.

Second, there is a magnetic resonance method which is a non-radiative wireless transmission technology using a near-field effect. The technology is based on an evanescent wave coupling scheme where electromagnetic wave moves from a medium to another medium through a near electromagnetic field when the mediums resonate at the same frequency. A charge station connected to a power source forms the electromagnetic field, and when approaching a portable device, including a receiver that has been designed at the same resonance frequency of MHz band, to inside the electromagnetic field, a kind of energy tunnel is formed between two mediums, thereby charging the portable device within a distance of several m from the charge station. Particularly, such energy is non-radiative and based on a magnetic field, and thus, only when there is a device having a resonance frequency, the energy is transferred to the device, but an unused portion of the energy is spread into the air and reabsorbed into an electromagnetic field. Therefore, unlike electromagnetic wave, the energy does not affect ambient machines and/or human bodies.

Third, there is a long-distance transmission technology using a short-wavelength wireless frequency within an electromagnetic wave range. The long-distance transmission technology uses an electromagnetic radiation scheme using microwave of 5.8 GHz, but is fatal to human bodies. Accordingly, the magnetic induction scheme and the magnetic resonance scheme have lately been put to practical use. A soft magnetic material used in the wireless charge scheme using the magnetic field is a soft ferrite (hereinafter referred to as "magnetic ferrite").

In general, the ferrite refers to a magnetic material which is strongly magnetized although an external magnetic field is slightly applied to the ferrite, and in which residual magnetization is small. Although saturation magnetization and residual magnetization of the magnetic material are ⅓ and ¼ of those of a metal material and are relatively small compared to the metal material, since electric resistance of the magnetic material is large, an eddy current loss is small and the magnetic is used at high frequency compared to the metal material. That is, the ferrite becomes a kind of magnet when the external magnetic field is applied, but loses a magnetic force and returns in its original condition when the external magnetic field is removed, and is operated by electric waves. The ferrite is indispensable as the magnetic core of a high frequency transformer and is applied to various uses such as a magnetic core of a communication coil for televisions, radios, etc. and an electromagnetic wave absorber and the like.

However, in a case where a conventional ferrite sintered compact has high damage frequency, its strength is vulnerable to an impact. Thus, when the conventional ferrite sintered compact is installed in wireless devices and the like, the high damage frequency are shown, and due to this, a magnetic property is reduced. As a result, it is problematic that as permeability reduces and a loss rate increases, charging efficiency also reduces.

Also, magnetic energy of the magnetic material such as the ferrite sintered compact and the like is changed to electric energy, and thus is used in wireless charging. However, when the magnetic material is adhered to a different kind of substrate while being used in a state of being changed to thermal energy, a delamination phenomenon occurs due to a difference in coefficient of expansion generated caused by the thermal energy.

DISCLOSURE

Technical Problem

The present invention has been proposed to solve the aforementioned drawbacks, and an aspect of the present invention provides an elastomer composition having an elastic restoring force.

Another aspect of the present invention provides an elastomer composition having excellent thermal stability, which can serve as a buffer layer compensating a difference in coefficient of expansion generated between a magnetic ferrite and a different kind of substrate.

Still another aspect of the present invention also provides a magnetic ferrite having improved impact resistance by being coating with the elastomer composition.

Technical Solution

According to an aspect of the present invention, there is provided an elastomer composition for coating a magnetic ferrite, the composition including: epoxy resin; acrylate resin; an organic filler; an inorganic filler; a cross linking agent; a hardener; an initiator; and a solvent.

According to another aspect of the present invention, there are provided a magnetic ferrite coated with the elastomer composition, and a wireless power transmitting and receiving device including the magnetic ferrite.

Advantageous Effects

According to embodiments of the present invention, the magnetic ferrite having improved impact resistance by being coated with the elastomer composition having the elastic restoring force can be provided, an existing problem such as a reduction in magnetic property caused by damage to the ferrite resulting from an external impact can be solved.

Furthermore, since the elastomer composition having excellent thermal stability serves as a buffer layer, the difference in coefficient of expansion generated between the magnetic ferrite and the substrate can be compensated, thereby controlling the delamination phenomenon from being generated between the magnetic ferrite and the substrate.

Thus, as described above, as the magnetic ferrite having excellent impact strength and solving the delamination phenomenon is used, a wireless power transmitting and receiving device having high permeability and a low loss rate can be provided.

DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a cross-sectional view showing a magnetic ferrite, an upper surface of which is coated with an elastic elastomer film according to an embodiment of the present invention;

FIG. 2 is a cross-sectional view showing a magnetic ferrite, an upper surface and a lower surface of which are coated with the elastic elastomeric film according to the embodiment of the present invention;

FIG. 3 is a cross-sectional view showing a magnetic ferrite coated in a side seal form with the elastic elastomer film according to the embodiment of the present invention;

FIG. 4 is a cross-sectional view showing a magnetic ferrite, an upper surface of which is coated with a porous elastic elastomer film according to other embodiment of the present invention;

FIG. 5 a cross-sectional view showing a magnetic ferrite, an upper surface and a lower surface of which are coated with the porous elastic elastomer film according to the other embodiment of the present invention; and FIG. 6 is a cross-sectional view showing a magnetic ferrite coated in a side seal form with the porous elastic elastomer film according to the other embodiment of the present invention.

BEST MODE

Hereinafter, exemplary embodiments of the present invention will be described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

An elastomer composition (for coating a magnetic ferrite) according to an embodiment of the present invention includes epoxy resin; acrylate resin; an organic filler; an inorganic filler; a cross linking agent; a hardener; an initiator; and a solvent, more specifically, (based on 100 parts by weight of the total amount of the composition), 3 to 5 parts by weight of an epoxy resin, 12 to 15 parts by weight of an acrylate resin, 20.5 to 21.5 parts by weight of an organic filler, 3 to 25 parts by weight of an inorganic filler, 10 to 30 parts by weight of a cross linking agent, 1 to 5 parts by weight of a hardener, 1 to 5 parts by weight of an initiator, and 20 to 24 parts by weight of a solvent.

The epoxy resin may be one selected from the group consisting of bisphenol A, bisphenol F, bisphenol S, cresol novolac, and phenoxy-based epoxy, or a mixture thereof. Also, the epoxy resin may use a mixture of general solid epoxy resin and liquid epoxy resin. As the solid epoxy resin having crystallizability is applied, ductility, stiffness, filling, an adhesive property, and a process capability, which are appropriate to a necessary temperature condition, could be implemented. As a result, a difference in coefficient of expansion between a magnetic ferrite coated with the elastomer composition including the epoxy resin and a different kind of substrate may be compensated, and a gap-filling property may be improved because a thermal history becomes excellent, thereby improving reliability of the magnetic ferrite for wireless charging, coated with the elastomer composition. In light of adjusting a tack property for a handling property, a ratio between the solid and liquid states of the epoxy resin may be 1:1 to 3:1. Also, it may be preferable that an amount of the epoxy resin ranges from 3 to 5 parts by weight based on 100 parts by weight of the total amount of the composition in light of an adhesive property and the like.

The acrylate resin may be one selected from the group consisting of TPGDA (tripropylene glycol diacrylate), DPGDA (dipropylene glycol diacrylate), TMPTA (trimethylolpropane triacrylate), CDA (cyclododecyl acrylate) and HDD (1,6-hexandiol diacrylate), or a mixture thereof. It would be preferable that the acrylate resin is used in an amount of 12 to 15 parts by weight based on 100 parts by weight of the total amount of the composition in light of an adhesive property.

The organic filler (having 50,000 or more molecular weight) may be one selected from the group consisting of liquid polybutadien, acrylonitrile butadiene, grycidyl acrylate and styrene butadiene, or a mixture thereof. It would be preferable that the organic filler is used in an amount of 20.5 to 21.5 parts by weight based on 100 parts by weight of the total amount of the composition in light of ductility, a modulus and tensile strength.

The inorganic filler may be one selected from the group consisting of silica and $TiO_2$, or a mixture thereof. The inorganic filler may be used in an amount of 1 to 25 parts by weight based on 100 parts by weight of the total amount of the composition. When the amount is less than 1 parts by weight, there is concern about reducing reliability and a gap-filling property as the magnetic material for wireless charging because heat conduction quality is lacking. When the amount exceeds 25 parts by weight, a process capability and reliability may be reduced due to an excessive thermal history.

The cross linking agent may be one selected from the group consisting of epoxy-terminated butadieneacrylonitrile (ETBN) rubber and carboxy-terminated butadieneacrylonitrile (CTBN) rubber, or a mixture thereof. The cross linking agent may be used in an amount of from 10 to 30 parts by weight based on 100 parts by weight of the total amount of the composition. The cross linking agent functions to improve the commercialization of a rubber ingredient and epoxy which are organic fillers. When the amount is less than 10 parts by weight, the cross linking agent may have difficulty in performing such a function. When the amount exceeds 30 parts by weight, there may be concern about reducing reliability for a moisture resistance test (MRT).

The hardener may be one selected from the group consisting of peroxide, hydroperoxide, peroxidicarbonate and a peroxiester-based hardener, or a mixture thereof. The hardener may be used in an amount of 1 to 5 parts by weight based on 100 parts by weight of the total amount of the composition. When the amount is less than 1 parts by weight, a desired hardening rate may not be obtained. When the amount exceeds 5 parts by weight, a deterioration in storage property and a reduction in molecular weight may be caused. Also, except for the hardener, one hardening accelerator or two or more hardening accelerators selected from the group consisting of an amine-based hardening accelerator, a peroxide-based hardening accelerator, and a phenol-based hardening accelerator may be additionally included.

The initiator may be one selected from the group consisting of a photoinitiator and a thermal initiator, or a mixture thereof. The photoinitiator is one selected from the group consisting of a long wavelength-band photoinitiator (for example, Irgacure 369, irgacure 651, irgacure 379 or the like) and a short wavelength-band photoinitiator (for example, Irgacure 254, irgacure 184 or the like), or a mixture thereof. Furthermore, the thermal initiator may be one selected from the group consisting of a peroxide-based initiator, a hydroperoxide-based initiator, a peroxidicarbonates-based initiator, and a peroxiester-based initiator, or a mixture thereof. Specifically, a thermal initiator having a half life of 30 to 60 minutes based on 90 to 130° C. may be used. The initiator may be used in an amount of 1 to 5 parts by weight based on 100 parts by weight of the total amount of the composition.

The solvent functions to adjust a B-staging rate and viscosity and the like, and is composed of a reactive solvent and a dilution solvent. It would be preferable that the solvent is used in an amount of 20 to 24 parts by weight based on 100 parts by weight of the total amount of the composition in light of a process capability, an adhesive property, and the like. The reactive solvent may be one or more solvent selected from the group consisting of methyl carbitol, ethoxytriglycol, methyl propasol, propyl dipropasol and butyl carbitol. The reactive solvent may be used in an amount of 4 to 10 parts by weight based on 100 parts by weight of the total amount of the composition.

On the other hand, another embodiment of the present invention provides a magnetic ferrite coated with the elastomer composition, and a wireless power transmitting and receiving device including the magnetic ferrite.

The elastomer composition may be coated on at least one or more surfaces selected from an upper surface, a lower surface and both sides of the magnetic ferrite. Specifically, FIG. 1 illustrates a case in which an elastomer composition 20a is coated on the upper surface of a magnetic ferrite 10, FIG. 2 illustrates a case in which the elastomer composition 20a is coated on the upper surface and a lower surface of the magnetic ferrite 10, and FIG. 3 illustrates a case in which the upper and lower surfaces and both sides of the magnetic ferrite 10 are coated in a side seal form.

Also, the elastomer composition may be coated on the magnetic ferrite in an elastic film form. The elastic film may be porous. Specifically, FIG. 4 to FIG. 6 illustrate cases in which the elastomer composition is each coated on the upper surface of the magnetic ferrite 10, the upper surface and the lower surface of the magnetic ferrite 10, and the upper surface and the lower surface and both sides of the magnetic ferrite 10.

Hereinafter, the present embodiment of the present invention will be more specifically described based on Examples.

EXAMPLE AND COMPARATIVE EXAMPLE

Elastomer compositions according to Examples 1, 2 and Comparative Example 1 to 4 were prepared based on each ingredient and amount described Table 1 below.

Specifically, each elastomer composition was prepared by primarily mixing liquid polybutadiene, a mixture of ETBN and CTBN, a mixture of TPGDA and DPGDA, a mixture of BPA and BPS in reactor using methylethylketone (MEK) at 300 rpm for about 8 to 10 hours in a water bath of 50° C., and then, adding toluene, peroxide, methyl carbitol, a UV initiator (Irgacure 369, irgacure 651, irgacure 379, Irgacure 254, irgacure 184 or the like), a thermal initiator (a peroxide-based initiator, a hydroperoxide-based initiator, a peroxidicarbonates-based initiator, a peroxyester-based initiator or the like), an organic filler (acrylonitrile butadiene, glycidyl acrylate, styrene butadiene or the like), and an inorganic filler (silica, $TiO_2$ or the like), and mixing at 500~2000 rpm for about four hours at room temperature.

Evaluation Method

After an upper surface and a lower surface of the magnetic ferrite have been coated with each elastomer composition prepared according to the examples and comparative examples using a lamination method under the conditions of a feeding speed of 50 mm/sec, a roll temperature of 50° C. and a lamination pressure of 500 gf/cm$^2$, in a film state, a modulus (MPa), peeling strength (gf/cm), and an elongation rate (%) were measured, and an acceleration test was measured at 85° C./85% for 24 hours. Based on this, evaluation results of impact resistance, the occurrence or non-occurrence of a delamination phenomenon, and a process capability are described in Table 1 below.

TABLE 1

| Division | Example 1 | Example 2 | Comparative Example 1 | Comparative Example 2 | Comparative Example 3 | Comparative Example 4 |
| --- | --- | --- | --- | --- | --- | --- |
| Liquid Polybutadiene | 11 | 11 | 10 | 10 | 12 | 12 |
| ETBN + CTBN | 10 | 12 | 10 | 12 | 8 | 10 |
| TPGDA + DPGDA | 14 | 15 | 12 | 15 | 10 | 11 |
| BPA + BPS | 3 | 3 | 3 | 5 | 3 | 3 |
| Peroxide | 2 | 3 | 4 | 4 | 2 | 3 |

TABLE 1-continued

| Division | | Example 1 | Example 2 | Comparative Example 1 | Comparative Example 2 | Comparative Example 3 | Comparative Example 4 |
|---|---|---|---|---|---|---|---|
| Methyl Carbitol | | 6 | 6 | 7 | 8 | 4 | 5 |
| Solvent (MEK/Toluene) | | 18 | 14 | 18 | 10 | 25 | 20 |
| UV initiator | | 2 | 2 | 2 | 2 | 2 | 2 |
| Thermal initiator | | 2 | 2 | 2 | 2 | 2 | 2 |
| Organic filler | | 10 | 10 | 10 | 10 | 10 | 10 |
| Inorganic filler | | 22 | 22 | 22 | 22 | 22 | 22 |
| Total | | 100 | 100 | 100 | 100 | 100 | 100 |
| Evaluation items | Modulus [MPa] | 5.2 | 4.3 | 4.3 | 3.3 | 2.3 | 1.3 |
| | Peel strength [gf/cm] | 329 | 188 | 253 | 169 | 229 | 235 |
| | Elongation [%] | 679 | 854 | 253 | 169 | 756 | 774 |
| | 85° C./85% 24 hr test | Pass | Pass | Pass | Pass | Fail | Fail |
| | Impact resistance | Pass | Pass | Fail | Fail | Pass | Pass |
| | Delamination phenomenon | No occurrence | No occurrence | No occurrence | No occurrence | Occurrence | Occurrence |
| | Process capability | Pass | Pass | Pass | Pass | Fail | Fail |

(unit: parts by weight)

As shown in Table 1 above, in a case where the magnetic ferrite is coated with the elastomer composition prepared according to the examples of the present invention, various physical properties such as the impact resistance, the process capability and the like are excellent, no delamination phenomenon between the magnetic ferrite and the elastomer film also occurs. On the contrary, in a case where the magnetic ferrite is coated with the elastomer composition according to the comparative examples, these effects are not shown.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. An elastomer composition, comprising:
3 to 5 parts by weight of an epoxy resin;
12 to 15 parts by weight of an acrylate resin;
20.5 to 21.5 parts by weight of an organic filler;
3 to 25 parts by weight of an inorganic filler;
10 to 30 parts by weight of a cross linking agent;
1 to 5 parts by weight of a hardener;
1 to 5 parts by weight of an initiator; and
20 to 24 parts by weight of a solvent,
wherein the solvent includes 4 to 10 parts by weight of a reactive solvent based on 100 parts by weight of a total amount of the elastomer composition,
wherein a weight ratio of a solid state to a liquid state of the epoxy resin is 1:1 to 3:1, and
wherein the acrylate resin is polymerized into a resin by small molecules of one selected from a group consisting of tripropylene glycol diacrylate, dipropylene glycol diacrylate, cyclododecyl acrylate and 1,6-hexanediol diacrylate, or a mixture thereof.

2. The elastomer composition of claim 1, wherein the epoxy resin is one selected from a group consisting of bisphenol A, bisphenol F, bisphenol S, cresol novolac, and phenoxy-based epoxy, or a mixture thereof.

3. The elastomer composition of claim 1, wherein the acrylate resin is polymerized into a resin by small molecules from a mixture of tripropylene glycol diacrylate and dipropylene glycol diacrylate.

4. The elastomer composition of claim 1, wherein the organic filler is one selected from a group consisting of liquid polybutadiene, acrylonitrile butadiene, glycidyl acrylate and styrene butadiene, or a mixture thereof.

5. The elastomer composition of claim 1, wherein the cross linking agent is one selected from a group consisting of epoxy-terminated butadieneacrylonitrile rubber and carboxy-terminated butadieneacrylonitrile rubber, or a mixture thereof.

6. The elastomer composition of claim 1, wherein the hardener is one selected from a group consisting of peroxide, hydroperoxide, peroxidicarbonate and peroxiiester-based hardener, or a mixture thereof.

7. The elastomer composition of claim 1, further comprising one hardening accelerator or two or more hardening accelerators selected from a group consisting of an amine-based hardening accelerator, a peroxide-based hardening accelerator, and a phenol-based hardening accelerator.

8. A magnetic ferrite coated with an elastomer composition according to claim 1.

9. The magnetic ferrite of claim 8, wherein the elastomer composition is coated on at least one or more surface selected from an upper surface, a lower surface and both sides of the magnetic ferrite.

10. The magnetic ferrite of claim 8, wherein the magnetic ferrite is coated with the elastomer composition in an elastic film form.

11. The magnetic ferrite of claim 10, wherein the elastic film is porous.

12. A wireless power transmitting and receiving device comprising a magnetic ferrite according to claim 8.

* * * * *